Jan. 9, 1962 H. G. FREEMAN 3,016,226
VALVE BONNET AND HANDLE
Filed Oct. 26, 1960
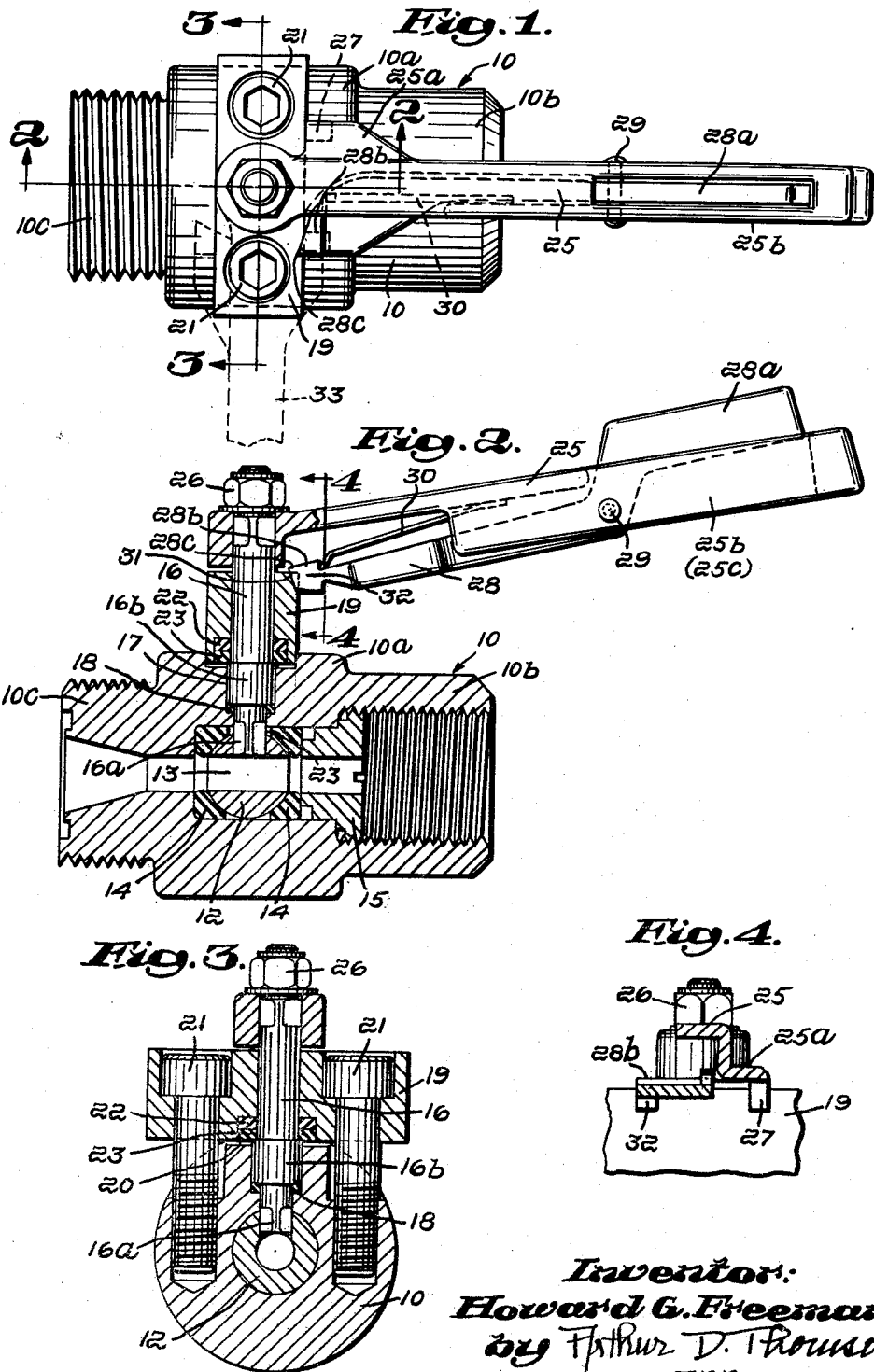
Inventor:
Howard G. Freeman,
by Arthur D. Thomson
Attorney

United States Patent Office 3,016,226
Patented Jan. 9, 1962

3,016,226
VALVE BONNET AND HANDLE
Howard G. Freeman, Worcester, Mass., assignor to Jamesbury Corp., Worcester, Mass., a corporation of Massachusetts
Filed Oct. 26, 1960, Ser. No. 65,176
2 Claims. (Cl. 251—109)

This invention relates to ball valves, and more particularly to the bonnet and handle construction of such valves.

A typical ball valve consists in general of a valve casing, which is intended to be connected in a pipe line, a ball having a through passage, a stem which engages the ball and projects out through the casing and is connected to a handle for turning the ball, and a bonnet which houses the stem. The stem is ordinarily surrounded by a sealing ring. One of the objects of this invention is to provide a bonnet construction for such a valve which is simple to manufacture and assemble, which requires no brazing or welding, and which permits the compression on the stem sealing ring to be readily adjusted. Another object is to provide means for automatically locking the valve handle to the bonnet in both the open and the closed position so that the handle cannot be turned accidentally.

Other objects and novel features of the invention will be apparent from the following description.

In the drawings illustrating the invention:

FIG. 1 is a top plan view of a valve constructed according to the invention;

FIG. 2 is a cross-section taken along line 2—2 of FIG. 1, parts of the valve handle being shown in elevation;

FIG. 3 is a cross-section taken along line 3—3 of FIG. 1; and

FIG. 4 is a fragmentary cross-section taken along line 4—4 of FIG. 2.

The valve has a casing 10, with a central portion 10a enclosing a valve chamber 11, and threaded tubular end portions 10b and 10c adapted to be connected to piping. A ball 12 having a through passage 13, and a pair of seat rings 14, for example, constructed according to United States Patent No. 2,945,666, are mounted in the valve chamber. The ball and seat rings are retained by an insert 15 threaded into the casing.

The casing has a top opening through which a stem 16 extends. The stem has a squared lower end 16a which is engaged in a recess in the ball. Above the lower end the stem has a cylindrical flange 16b, which is received in a recess 17 in the casing and bears on a sealing ring 18 mounted in the recess.

A rectangular bonnet block 19 is mounted in a shallow groove 20 milled transversely across the top of the casing 10, and is secured by bolts 21 threaded into the casing. The stem 16 passes through the bonnet block and through a bushing 22 and seal ring 23 mounted in a recess in the under part of the block.

A handle 25 is secured to the upper end of the stem by means of a nut 26. Near the bonnet block the handle has a wing 25a, carrying a downwardly extending lug 27. Toward its outer end the handle has downwardly extending side flanges 25b, 25c, between which a lever 28 is rotatably mounted on a pin 29. The lever has hand grip 28a which extends up through a slot 30 in the handle. Along the inner end of the lever is a ridge 28b, which engages the inner end of a leaf spring 30, the other end of which is attached to the under side of the handle. The spring biases the lever in a clockwise direction, as viewed in FIG. 2.

The extreme inner end portion 28c of lever 28 extends beyond the plane of the adjacent side face of bonnet 19, and engages in a notch 31 in the bonnet, when the handle is in open position, as shown in full line in FIGS. 1 and 2. The lever also has a downwardly projecting lug 32.

To close the valve, the inner end of the lever 28 is raised by pressing down on hand grip 28a, so that it will pass over the top of the bonnet block. The handle can then be turned to open position, as indicated by the dotted outline 33 in FIG. 1. In this position lug 27 engages against the right-hand side of the bonnet block. When the hand grip is released, lever 28 springs back to its original position, and lug 32 engages the opposite side of the bonnet block, thus locking the handle in place. To open the valve again, the lock is released by pressing down on hand grip 28a. The handle is then turned to open position and the lever automatically locks it in place again when the hand grip is released.

What is claimed is:

1. A ball valve comprising a valve casing having a through passage, a ball mounted in said passage and having a through opening, a stem extending into said casing and engaging said ball, said stem having a non-rotatable connection with said ball and being adapted to turn said ball between a closed position and an open position in which said opening is aligned with said passage, a bonnet block having a pair of parallel faces extending transversely across said casing, a handle secured to said stem, and a latch member swingably mounted on said handle, said latch member engaging one of said faces when the ball is in open position and the other of said faces when the ball is in closed position and said handle having a projection engaging one of said faces engaged by said latch member when the ball is in open position and the same face when the ball is in closed position.

2. A ball valve as described in claim 1, said bonnet block having a notch and said latch member having an end portion engaged in said notch when the ball is in open position, and the valve having a spring engaging said latch member and handle and tending to press said end portion into said notch.

References Cited in the file of this patent

UNITED STATES PATENTS

| | | |
|---|---|---|
| 1,380,307 | Capewell | May 31, 1921 |
| 2,895,710 | Sanctuary | July 21, 1959 |
| 2,940,725 | Nagel | June 14, 1960 |

FOREIGN PATENTS

| | | |
|---|---|---|
| 1,027,029 | Germany | Mar. 27, 1958 |